United States Patent
Phillips

(10) Patent No.: US 11,632,946 B2
(45) Date of Patent: Apr. 25, 2023

(54) CAT DETERRENT COMPOSITIONS AND METHODS OF USE OF SAME

(71) Applicant: Shelley Phillips, Edmonton (CA)

(72) Inventor: Shelley Phillips, Edmonton (CA)

(73) Assignee: SKEDDADER INC., Edmonton (CA)

( * ) Notice: Subject to any disclaimer, the term of this patent is extended or adjusted under 35 U.S.C. 154(b) by 0 days.

(21) Appl. No.: 16/566,700

(22) Filed: Sep. 10, 2019

(65) Prior Publication Data

US 2020/0085034 A1 Mar. 19, 2020

Related U.S. Application Data

(60) Provisional application No. 62/730,961, filed on Sep. 13, 2018.

(51) Int. Cl.
*A01M 29/12* (2011.01)
*C11B 9/02* (2006.01)

(52) U.S. Cl.
CPC .............. *A01M 29/12* (2013.01); *C11B 9/02* (2013.01)

(58) Field of Classification Search
CPC .................. A01M 29/12; C11B 9/02
See application file for complete search history.

(56) References Cited

U.S. PATENT DOCUMENTS

| | | | |
|---|---|---|---|
| 4,169,898 A | 10/1979 | Haase et al. | |
| 5,017,397 A | 5/1991 | Nguyen et al. | |
| 5,120,558 A | 6/1992 | Nguyen et al. | |
| 9,314,018 B2 | 4/2016 | Pageat | |
| 2014/0245968 A1* | 9/2014 | Dinnes | A01N 65/22 119/712 |
| 2014/0352630 A1 | 12/2014 | Messina | |

FOREIGN PATENT DOCUMENTS

JP 58110502 A * 7/1983

OTHER PUBLICATIONS

Reverchon, E. et al., "Isolation of rosemary oil: Comparison between hydrodistillation and supercritical CO2 extraction", Flavour and Fragrance Journal, 1992, vol. 7, 227-230.*
Levine, "Whole herb vs. herbal extract: Which is better?", vitalplan.com, Mar. 2, 2018. (printed from https://vitalplan.com/blog/whole-herb-vs-herbal-extract-which-is-better on Feb. 26, 2020). (Year: 2018).*
P. Allen Smith, Herbal Moth Repellent, Mar. 8, 2014, [online] retrieved Jan. 10, 2020, Retrieved from the Internet: <https://pallensmith.com/tag/diy/page/7/>.
Greengardenista, Natural cat repellent a natural way to keep away stray cats, Jul. 28, 2008 [online] retrieved Jan. 10, 2020 ,, https://www.greengardenista.com/blog/natural-cat-repellent-a-natural-way-to-keep-away-stray-cats/.
Ouzzar, ML et al. Comparison of the performance of hydrodistillation and supercritical CO2 extraction processes for essential oil extraction from rosemary (*Rosmarinus officinalis* L.) Chemical Engineering Transactions, 2015, vol. 43, pp. 1129-1134.
Formari, T. Et al, Isolation of essential oil from different plans and herbs by supercritical fluid extraction. Journal of Chromatography A, 2012, vol. 1250, pp. 34-488.

* cited by examiner

*Primary Examiner* — Gina C Justice
(74) *Attorney, Agent, or Firm* — CKS Legal

(57) ABSTRACT

The present invention is directed to novel compositions of rosemary extracts for use as a cat-deterrent formulation. The compositions of the present invention may be applied directly to an area, or object, to which it is desired to deter cats or animals from loitering or interaction. It is further contemplated that the compositions of the present invention may be applied directly to an area, or alternatively, be encapsulated in a container which substantially retains the solid components of the compositions of the present invention, but allows transport of the aromatic compounds.

2 Claims, No Drawings

CAT DETERRENT COMPOSITIONS AND METHODS OF USE OF SAME

FIELD OF THE INVENTION

The present invention pertains to the field of cat deterrent compositions comprised of novel combinations of rosemary extracts.

BACKGROUND OF THE INVENTION

All of the publications, patents and patent applications cited within this application are herein incorporated by reference in their entirety to the same extent as if the disclosure of each individual publication, patent application or patent was specifically and individually indicated to be incorporated by reference in its entirety.

Although the cat has been domesticated and as such forms part of the lives of many humans; their marking, scratching and excretion habits can be an unacceptable nuisance. Therefore, it is occasionally desirable to discourage the presence of cats, and animals in general, from certain areas, either outdoor or indoor; or to discourage cats, or animals, from interacting with certain objects. This can be to discourage the marking of areas with urine by the cat, to prevent scratching, or excreting in unacceptable areas.

There are a number of animal deterrent compositions known in the art, including those described in issued United States patents, such as U.S. Pat. No. 4,853,413, which discloses a composition containing citronellyl nitrile and citronellol; U.S. Pat. No. 4,735,803 which discloses a composition containing lemon oil and alpha-terpinyl methyl ether; and U.S. Pat. No. 3,474,176 which discloses a composition containing at least one saturated aliphatic ketone having from 7 to 19 carbon atoms. Further, U.S. Patent Application 2014/0245968 discloses a mixture of a multiplicity of peppermint, thyme, clove and rosemary.

Although many options for cat deterrents have been taught in the art, they suffer from complexity of components, poor shelf life, or odors which are a deterrent to cats but also displeasing to humans.

Thus, there is a need in the art to provide a cat deterrent which provides durable deterrence to cats and animals, has components derived from a natural source, and provides odors that are generally acceptable to humans.

It is therefore an object of the present invention to provide for compositions useful for the deterrence of cats from approaching or loitering from areas in which the deterrent is present.

It is a further object of the present invention to provide for methods for the manufacture of compositions useful for the deterrence of cats from approaching or loitering from areas in which the deterrent is present.

SUMMARY OF THE INVENTION

In one aspect, the present invention provides for an animal deterrent composition comprising a mixture of extracted rosemary oil and extracted rosemary solids, wherein said extracted rosemary solids and extracted rosemary oil are the result of substantial removal of molecules with antioxidant properties by use of supercritical carbon dioxide extraction.

In one embodiment, the present invention provides for an animal deterrent composition comprising about 0.1 to about 1.0 part extracted rosemary oil and about eight parts extracted rosemary solids, by volume.

In another aspect, the present invention provides for a cat deterrent composition comprising a mixture of extracted rosemary oil and extracted rosemary solids, wherein said extracted rosemary solids and extracted rosemary oil are the result of substantial removal of molecules with antioxidant properties by use of supercritical carbon dioxide extraction.

In one embodiment, the present invention provides for a cat deterrent composition comprising about 0.1 to about 1.0 part extracted rosemary oil and about eight parts extracted rosemary solids, by volume.

In another aspect, the present invention provides for dog, deer or rabbit deterrent composition comprising a mixture of extracted rosemary oil and extracted rosemary solids, wherein said extracted rosemary solids and extracted rosemary oil are the result of substantial removal of molecules with antioxidant properties by use of supercritical carbon dioxide extraction.

In one embodiment, the present invention provides for a dog, deer or rabbit deterrent composition comprising about 0.1 to about 1.0 part extracted rosemary oil and about eight parts extracted rosemary solids, by volume.

In another aspect, the present invention provides for a cat, dog, deer and rabbit deterrent composition comprising 1.5-2.5% beta-Pinenes, 11-15% Camphor, 1-1.5% Camphene, 4-6% Borneol, 6-9% Caryophyllene, 4-6% alpha-Tepineol, 1-1.5% Linalool, 0.5-1% Myrcene, 0.5-1% beta-Cymene, 4-5% gamma-Cadinene, 5-7% Heneicosane, 3-5% Octacosane; and less than 0.2% alpha-Pinene and less than 0.2% Bornyl acetate.

DETAILED DESCRIPTION OF THE PRESENT INVENTION

The objects are accomplished by a composition of the present invention, comprising a mixture of extracted rosemary oil, extracted from dried rosemary needles; combined with dried, ground rosemary sprigs and needles with substantial amounts of oil removed. This provides a composition with the novel attribute of enhanced, and prolonged deterrent activity against cats and other animals.

As used herein, "Rosemary" means *Rosmarinus officinalis*, but it is contemplated to include other species of *Rosmarinus* herbs including *Rosmarinus eriocalyx, Rosmarinus tomentosus* and *Rosemarium palaui*.

As used herein, "cat" means animals belonging to the Felidae family, which includes wild and domestic cats.

As used herein, "extracted rosemary solids" means the dried, solid remnant rosemary needles which have had a substantial amount of the antioxidant portion removed, using, by way of non-limiting example, supercritical carbon dioxide extraction, such as described by Nguyen et al. in U.S. Pat. No. 5,017,397; using methodologies more generally described in U.S. Pat. No. 5,120,558 and otherwise known in the art (see, for example, Reverchon E., et al Modeling of supercritical fluid extraction from herbaceous matrices Ind. Eng. Chem. Res. (1993) 32:2721-2726).

As used herein, "extracted rosemary oil" means the hydrophobic, liquid at room temperature, fraction of whole rosemary needles subjected to supercritical carbon dioxide extraction, which have been depleted of antioxidants as described by Nguyen et al. in U.S. Pat. No. 5,017,397.

As used herein "deterrent" means discouraging an animal from being near the composition of the present invention, but does not encompass the prevention, or prohibition of an animal from the area proximate to the composition of the present invention.

It is contemplated by the present invention that extracted rosemary solids and extracted rosemary oil may be prepared, wherein a substantial portion of the molecules with known antioxidant properties have been removed by extraction processes known in the art, for example the supercritical carbon dioxide extraction process described by Nguyen in U.S. Pat. No. 5,017,397. This provides extracted rosemary solids and extracted rosemary oils, when used in the ratios and forms disclosed herein, with the novel and unexpected cat, dog, deer or rabbit deterrent properties, while also allowing use or sale of the highly valuable and useful antioxidants removed by the supercritical carbon dioxide extraction process. As used with respect to the removal of molecules of known antioxidant properties from rosemary, a "substantial portion" means removal of fraction with an observed antioxidant activity of less than 3.8 milliequivalents of peroxide per kg extracted fat, specifically lard; using the antioxidant assessment methodology described by Nguyen in U.S. Pat. No. 5,017,397.

Rosemary is known in the art as having deterrent activities against animals, and is used as a, feline deterrent, and animal deterrent (including, but not limited to dogs, rabbits and deer). The present invention is based on the novel and unobvious finding that a novel ratio of extracted rosemary oil and extracted rosemary solids provides long-lasting, and effective deterrent activity for dogs, deer, rabbits and cats, compared to the deterrent actions reported in the prior art.

The present invention arises from the advantageous and novel discovery that certain ratios of extracted rosemary oil with ground or milled extracted rosemary solids provide improved and more durable animal deterrent which includes, but is not limited to, cats, dogs, deer and rabbits. It is known in the art that animals are deterred by the presence of rosemary, and the prior art has described suspension of milled rosemary in fluids, and in combination with various other herbal or aromatic compounds (such as citronella). These prior art formulations have suffered from complexity of formulation, poor lifespan in mixture form or upon application, or displeasing odor. Although odor is a subjective assessment, many feline deterrent formulations known in the art can have, what is often described as a "chemical" odor.

Further, fluid suspensions of cat deterrent formulations, as known in the art, have the disadvantage of the inability to remove the formulations once applied to the area to which cats are to be discouraged from loitering or engaging with. Once applied, removal of the deterrence activity can occur only with washing (with or without detergents) or with the passage of time, so as to have the formulation lose efficacy. While this may be acceptable for some applications, this is a disadvantage when trying to temporarily deter dogs, rabbits, cats or deer from areas, or from engagement with certain objects.

The ratio of one part extracted rosemary oil with eight parts extracted rosemary solids (v/v) is observed to provide effective deterrent activity for outdoor applications, with the observation that 0.1 to 1 part extracted rosemary oil to eight parts extracted rosemary solids (v/v) is effective for indoor applications, where a household pet is present. In such circumstances, it is contemplated to reduce the amount of rosemary oil, optionally with the addition of neutral oil. As used herein, "neutral oil" means an oil which is non-reactive with the extracted rosemary oil and rosemary solid fraction, which is soluble with the rosemary oil fraction, and which does not have cat deterrent activity. It is observed that a ratio of one-half part extracted rosemary oil, one half part neutral oil and eight parts extracted rosemary solids is particularly effective in deterring cats in an indoor setting, with similar duration of efficacy as with higher extracted rosemary oil ratios, but with decreased area of deterrence. This is particularly important for indoor pets where it may be desirable to deter the animal from a specific location, for example a potted plant, but loitering in the area surrounding the plant is acceptable.

The novel and unexpected observation that cat deterrent activity is observed in extracted rosemary oil and extracted rosemary solids, in the ratios contemplated herein, even when a substantial portion of the molecules with known antioxidant properties have been removed by extraction processes known in the art. This provides for a novel, unexpected and useful utility for these byproducts of the antioxidant extraction of rosemary, for example through use of supercritical carbon dioxide solvent extraction.

The compositions of the present invention are contemplated to be administered directly to an area or region to which cat deterrence is desired. It is also contemplated that the compositions of the present invention can be encapsulated in a container which maintains the solid particles of the compositions of the present invention, while allowing communication of its volatile components with the surrounding area. One example of such a container would be a satchet which, as used herein, means any container, bag and/or packet made of fabric or other "breathable" material which allows the volatile compounds to permeate in the surrounding region, while encapsulating the solid components of the compositions described herein. This enables temporary placement of the compositions of the present invention in a region, with easy removal and transfer of the compositions. No specific size, composition, or shape of the container is required, so long as the material is capable of allowing communication of volatile components with the surrounding area, while substantially maintaining enclosure of the solid components.

In order to illustrate the present invention, the following examples are provided.

Example 1: Observation of Deterrence Activity for Cats

Eight cats were assessed, at a baseline, with free access to an environment absent the 0.5:8 extracted rosemary oil to extracted rosemary solids (16.7% oil by weight) with observation of their motivation towards food, or a perching shelf with a "hiding space" within a test room; and from those eight cats, five were selected for continuing in the treatment phase. Specialized software (Ethovision XT, Noldus Information Technology) was used to assess the frequency and duration of both contact with, and proximity to, objects in the test room. Baseline scores were used to select the five cats that exhibited the most interest towards either the perching shelf or hiding space. That same afternoon, the selected cats underwent identical object-approach assessments in the presence of the 0.5:8 extracted rosemary oil to extracted rosemary solids, located proximate to objects observed to be preferred by the cat, to determine its efficacy as a deterrent.

At a dose of 20 g/m$^2$ the two females of the five cats, showed a marked decrease in the time spent near, or in contact, with the object they previously showed preference for (either the food or hiding space). The remaining three male cats showed, at most, only a slight decrease in contact or proximity to the object they previously showed preference for.

The female cats were observed to approach the object of preferred interest, sniffed the area, and then afterwards avoided the area for the remainder of the test session.

Example 2: Observation of Deterrence Activity for Male Cats at Higher Dosage The three male cats were then tested at a higher dose of 85 g/m² of the 0.5:8 extracted rosemary oil to extracted rosemary solids (16.7% oil by weight). At this higher dose, all three male cats showed a marked decrease in time spent near, or in contact, with their preferred object, as compared to baseline (87 seconds decrease, at minimum). Two of the three male cats showed behaviors consistent with wanting to approach an object of demonstrated prior interest (food), however they avoided the area. Although one of the male cats did spend time consuming food in the area in which the 0.5:8 extracted rosemary oil to extracted rosemary solids was placed, time spent in contact in the area was decreased compared to the baseline session, and the first session with the lower dosage of the composition of the present invention.

Time spent with the object demonstrated as being a non-preferred object at baseline observations (the hiding space) was increased when in the presence of the 85 g/m² dosage of the composition of the present invention was located proximate to the observed preferred object of the cat.

Example 3: Observation of Deterrence Activity of Extracted Rosemary Antioxidants 45 mls of Natureguard (Newlywed Foods, Edmonton, Alberta) which is composed of rosemary antioxidants extracted by way of supercritical carbon dioxide extraction, in solid, powdered form; was placed in proximity of two housecats, one male and one female. The presence of Natureguard had no observable effect on the behavior of the cats. Likewise, 45 mls of Natureguard mixed with 45 mls of the 1:8 ratio of extracted rosemary oil to extracted rosemary solids of the present invention, had no observable negative effect on the cat deterrent activity of the composition of the present invention.

Example 4: Compositional Analysis of Extracted Rosemary Oil

As the extracted rosemary oil of the present invention is the result of an extraction process removing a significant portion of the antioxidants present in whole rosemary, it is also missing a number of compounds normally present in rosemary oil associated with fragrance, flavor or aromatherapy. Therefore, compositional analysis of the extracted rosemary oil of the present invention was conducted. Table 1 presents the results of a compositional analysis of one sample of extracted rosemary oil, which is contemplated to vary in composition, from batch to batch, within +1-15%. Of particular note is the absence of Bornyl acetate and alpha-Pinene, which is a component of rosemary essential oil, generally commercially available.

TABLE 1

Composition of a sample of extracted rosemary oil.

| Compound Detected | Percentage Composition of Sample |
|---|---|
| Cyclopentaneacetic acid | 1.05% |
| beta-Cymene | 0.74% |

TABLE 1-continued

Composition of a sample of extracted rosemary oil.

| Compound Detected | Percentage Composition of Sample |
|---|---|
| alpha-Pinene | 0.00% |
| Camphene | 1.30% |
| Cyclofenchene | 5.20% |
| alpha-Terpinene | 0.33% |
| beta-Myrcene | 0.75% |
| beta-Pinene | 2.02% |
| gamma-Terpinene | 0.43% |
| Verbenone | 0.81% |
| Camphor | 12.88% |
| Borneol | 4.83% |
| Eucalyptol | 34.61% |
| Linalool | 1.02% |
| Terpinen-4-ol | 0.73% |
| alpha-Terpineol | 5.17% |
| Bornyl acetate | 0.00% |
| Caryophyllene | 7.45% |
| Humulene | 0.68% |
| alpha-Cubebene | 0.82% |
| gamma-Cadinene | 4.36% |
| Caryophyllene oxide | 1.44% |
| Totarol | 1.03% |
| Heneicosane | 6.30% |
| Tetracosane | 0.60% |
| Octacosane | 3.36% |
| Squalene | 0.92% |
| beta-Amyrone | 1.16% |

Example 5: Observation of Deterrence Activity with Variation of Component Ratios In order to determine the range of effective ratios of extracted rosemary oil and extracted rosemary solids, various formulations comprising differing ratios of the extracted rosemary oil and extracted rosemary solids were tested by blinded volunteers. Minimum days of reported efficacy, as well as the specific animals to which deterrence activity was sought, were collected and the results presented in Table 2.

TABLE 2

Effect of ratio of extracted rosemary oil to extracted rosemary solids

| Ratio of Extracted Rosemary Oil to Extracted Rosemary Solids | Percentage of Extracted Rosemary Oil, by weight | Deterrent Focus | Minimum duration of observed efficacy |
|---|---|---|---|
| 0.1:8 | 3.9% | Indoor Cats | 12 days |
| 0.1:8 | 3.9% | Indoor Cats | 20 days |
| 0.2:8 | 7.4% | Indoor Dogs | 25 days |
| 0.2:8 | 7.4% | Outdoor Cats | 26 days |
| 0.2:8 | 7.4% | Outdoor Cats | 27 days |
| 0.2:8 | 7.4% | Outdoor Rabbits | 21 days |
| 0.3:8 | 10.7% | Outdoor Cats | 27 days |
| 0.5:8 | 16.7% | Outdoor Cats and Dogs | 37 days |
| 0.8:8 | 23.8% | Outdoor Cats | 4 months |
| 0.8:8 | 23.8% | Outdoor Cats | 2 months |
| 0.8:8 | 23.8% | Outdoor Deer | 31 days |

While particular embodiments of the present invention have been described in the foregoing, it is to be understood that other embodiments are possible within the scope of the invention and are intended to be included herein. It will be clear to any person skilled in the art that modifications of and adjustments to this invention, not shown, are possible without departing from the spirit of the invention as demonstrated through the exemplary embodiments. The invention is therefore to be considered limited solely by the scope of the appended claims.

What is claimed is:

1. A method for deterring animals from an area comprising placing in an area a mixture of extracted rosemary oil and extracted rosemary solids wherein said extracted rosemary solids and extracted rosemary oil are the result of a substantial portion of molecules with antioxidant properties being removed by use of supercritical carbon dioxide extraction and wherein the mixture comprises about 0.1 to about 1.0 part extracted rosemary oil and about eight parts extracted rosemary solids.

2. A method for deterring animals from an area comprising placing in an area a sachet containing an animal deterrent comprising a mixture of extracted rosemary oil and extracted rosemary solids wherein said extracted rosemary solids and extracted rosemary oil are the result of a substantial portion of molecules with antioxidant properties being removed by use of supercritical carbon dioxide extraction and wherein the mixture comprises about 0.1 to about 1.0 part extracted rosemary oil and about eight parts extracted rosemary solids.

* * * * *